US007691274B2

(12) United States Patent
Wnuk et al.

(10) Patent No.: US 7,691,274 B2
(45) Date of Patent: Apr. 6, 2010

(54) FILTER INSTALLATION AND METHOD FOR OPERATING ONE SUCH FILTER INSTALLATION

(75) Inventors: Ralf Wnuk, Bexbach (DE); Thomas Schneider, Friedrichsthal (DE)

(73) Assignee: Hydac Process Technology GmbH, Sulzbach/Saar (DE)

( * ) Notice: Subject to any disclaimer, the term of this patent is extended or adjusted under 35 U.S.C. 154(b) by 0 days.

(21) Appl. No.: 11/794,196

(22) PCT Filed: Feb. 8, 2006

(86) PCT No.: PCT/EP2006/001087

§ 371 (c)(1),
(2), (4) Date: Jun. 26, 2007

(87) PCT Pub. No.: WO2006/099915

PCT Pub. Date: Sep. 28, 2006

(65) Prior Publication Data

US 2008/0067119 A1      Mar. 20, 2008

(30) Foreign Application Priority Data

Mar. 24, 2005      (DE) ................... 10 2005 013 673

(51) Int. Cl.
  *B01D 29/52*      (2006.01)
  *C02F 1/46*       (2006.01)

(52) U.S. Cl. .................. 210/764; 210/791; 210/136; 210/205; 210/209; 210/323.2; 210/333.1; 210/497.3

(58) Field of Classification Search .............. None
See application file for complete search history.

(56) References Cited

U.S. PATENT DOCUMENTS

| 2,097,645 | A | * | 11/1937 | Ritter ...................... 209/41 |
| 3,280,980 | A | * | 10/1966 | King ....................... 210/108 |
| 3,445,002 | A | * | 5/1969  | Muller ..................... 210/108 |
| 4,462,916 | A | * | 7/1984  | Ecabert et al. ............. 210/798 |

(Continued)

FOREIGN PATENT DOCUMENTS

DE      36 40 841      6/1987

(Continued)

OTHER PUBLICATIONS

Mario N. Tamburri et al., Ballast Water Deoxygenation Can Prevent Aquatic Introductions While Reducing Ship Corrosion, 11 pages, Copyright 2001.*

(Continued)

*Primary Examiner*—Robert James Popovics
(74) *Attorney, Agent, or Firm*—Roylance, Abrams, Berdo & Goodman, L.L.P.

(57) ABSTRACT

A filter installation and method, especially a seawater filter installation and method, includes at least one fluid line (18, 20) for transporting a biological fluid, a filter device (54) mounted in the fluid line with at least one filter element (22) in a filter housing (10), and a device for biological decontamination. The device for biological decontamination contains active substances that can be introduced into the filter housing (10), such as inert gases or special metals, ensuring that toxic impurities cannot enter. The active substances used are ecofriendly unlike chemically produced fungicides and herbicides.

20 Claims, 1 Drawing Sheet

U.S. PATENT DOCUMENTS

| | | | |
|---|---|---|---|
| 4,666,592 A * | 5/1987 | Bea | 210/107 |
| 5,013,415 A | 5/1991 | Hudson | |
| 5,256,423 A * | 10/1993 | Egusa et al. | 424/616 |
| 5,563,585 A | 10/1996 | MacDonald | |
| 6,402,965 B1 * | 6/2002 | Sullivan et al. | 210/748 |
| 6,516,738 B2 * | 2/2003 | Cannon | 114/125 |
| 6,773,611 B2 * | 8/2004 | Perlich et al. | 210/758 |
| 6,799,687 B1 * | 10/2004 | Schon | 210/411 |
| 7,005,074 B2 * | 2/2006 | Nguyen et al. | 210/748 |
| 7,025,889 B2 * | 4/2006 | Brodie | 210/748 |
| 7,087,804 B2 * | 8/2006 | O'Rear | 585/899 |
| 7,244,348 B2 * | 7/2007 | Fernandez et al. | 205/701 |
| 7,351,336 B2 * | 4/2008 | Nguyen et al. | 210/205 |
| 7,374,692 B2 * | 5/2008 | Hesse et al. | 210/748 |
| 7,381,338 B2 * | 6/2008 | van Leeuwen et al. | 210/760 |
| 7,396,460 B2 * | 7/2008 | Wnuk et al. | 210/223 |
| 2002/0074954 A1 * | 6/2002 | Stack | 315/291 |
| 2003/0015481 A1 * | 1/2003 | Eidem | 210/760 |
| 2004/0055939 A1 | 3/2004 | Wybo | |
| 2004/0055966 A1 * | 3/2004 | Nguyen et al. | 210/748 |
| 2004/0099608 A1 * | 5/2004 | Leffler et al. | 210/704 |
| 2004/0129645 A1 * | 7/2004 | Perlich et al. | 210/758 |
| 2004/0134861 A1 * | 7/2004 | Brodie | 210/748 |
| 2004/0251215 A1 * | 12/2004 | Bai et al. | 210/748 |
| 2004/0259961 A1 * | 12/2004 | O'Rear | 518/726 |
| 2005/0016933 A1 * | 1/2005 | Perlich et al. | 210/754 |
| 2005/0211639 A1 * | 9/2005 | Nguyen et al. | 210/748 |
| 2005/0258112 A1 * | 11/2005 | Hesse et al. | 210/788 |
| 2006/0113257 A1 * | 6/2006 | Fernandez et al. | 210/756 |
| 2006/0243184 A1 * | 11/2006 | O'Rear | 114/121 |
| 2006/0243950 A1 * | 11/2006 | O'Rear | 252/372 |
| 2006/0273041 A1 * | 12/2006 | Maddox | 210/748 |
| 2007/0029244 A1 * | 2/2007 | Wnuk et al. | 210/223 |
| 2007/0068860 A1 * | 3/2007 | Lothe | 210/188 |
| 2007/0158208 A1 * | 7/2007 | Jung et al. | 205/742 |
| 2007/0158261 A1 * | 7/2007 | Wnuk | 210/333.01 |
| 2007/0246424 A1 * | 10/2007 | Honda et al. | 210/636 |
| 2008/0000775 A1 * | 1/2008 | Childers et al. | 204/556 |
| 2008/0017591 A1 * | 1/2008 | Ranade et al. | 210/767 |
| 2008/0067119 A1 * | 3/2008 | Wnuk et al. | 210/170.11 |
| 2008/0149485 A1 * | 6/2008 | Childers et al. | 204/555 |
| 2008/0190826 A1 * | 8/2008 | Miner et al. | 210/98 |
| 2008/0190864 A1 * | 8/2008 | Haeffner et al. | 210/748 |
| 2008/0277274 A1 * | 11/2008 | Kim et al. | 204/275.1 |
| 2008/0277354 A1 * | 11/2008 | Baerheim et al. | 210/750 |
| 2008/0283467 A1 * | 11/2008 | Nguyen | 210/600 |
| 2008/0290044 A1 * | 11/2008 | Nanjundiah et al. | 210/748 |

FOREIGN PATENT DOCUMENTS

| | | |
|---|---|---|
| DE | 19718028 C1 * | 6/1998 |
| DE | 197 11 589 | 9/1998 |
| DE | 20 2004 002 616 | 6/2004 |
| DE | 102004037280 A1 * | 3/2006 |
| EP | 0 245 585 | 11/1987 |
| EP | 0 481 391 | 4/1992 |
| JP | 2007090212 A * | 4/2007 |
| JP | 2008119644 A * | 5/2008 |
| WO | WO 0137965 A1 * | 5/2001 |
| WO | WO 03/002406 | 1/2003 |
| WO | WO 2004103525 A1 * | 12/2004 |
| WO | WO 2006099915 A1 * | 9/2006 |

OTHER PUBLICATIONS

Hydac International RF3 Housing Brochure—8 pages, downloaded May 8, 2009.*

Hydac International RF4 Housing Brochure—7 pages, downloaded May 8, 2009.*

* cited by examiner

FILTER INSTALLATION AND METHOD FOR OPERATING ONE SUCH FILTER INSTALLATION

FIELD OF THE INVENTION

The present invention relates to a filter installation, in particular a seawater filter installation with at least one fluid line through which a biologically contaminated fluid can be transported. A filter is interposed in this fluid line, and has at least one filter element in a filter housing with agents for biological decontamination.

BACKGROUND OF THE INVENTION

DE 20 2004 002 616 U1 discloses a generic water filter installation, a seawater filter installation in particular, comprising a water line as a fluid line and a filter connected between two line sections of the fluid line. Individual filter elements are provided with a filter surface located in the filter interior for filtering water. One line section forms a feed line to the filter for the water to be cleaned. The other line section forms a drain line for the filtered water. In the known solution, feeding and draining of the filter can be blocked relative to the water line with blocking means (valves). The filter interior can be heated by a heating means with the blocking means blocked to a setpoint temperature of more than 50° C., preferably approximately 60±5° C. for decontamination of the filter surface. Preferably, the filter is designed as a backflushing filter with a backflushing means for cleaning the filter surfaces in counterflow to the actual filtering direction.

Aboard ship, such as for example container ships, ballast water is pumped on board in a particular harbor or underway in certain waters to be able to equalize missing ship's ballast. Ballast equalization can be achieved while sailing for example by a decreasing amount of fuel and by taking on new seawater ballast and/or pumping seawater between the individual ballast chambers to level the ship. When a new harbor is being approached and ballast water is pumped out into the harbor basin to load the ship with new cargo, it cannot be precluded that living organisms taken aboard in the original harbor or underway will be discharged in the new port of call. Thus, in a type of biological tourism, foreign organisms become settled in the biotopes, where they in fact do not belong, with the result that they can displace native species to their complete extinction. This occurrence can lead to a serious environmental situation. In addition to viruses, fungi, algae, protozoa, and other microorganisms can also be transported at the same time in this way. However, tiny organisms can indeed also be transported at the same time, including mussels and the like.

With the known solution according to the German utility model, this biological contamination is controlled by heating all the parts located in the filter interior of the filter for a sufficient time interval to a high enough temperature, for example 60° C., to kill algae, microorganisms and other tiny organisms. With the corresponding backflushing process, the killed organisms are returned immediately to the original water and are not delivered into foreign water after a forthcoming voyage. By preference, the known solution calls for cleaning by superheated steam. As a result of the indicated high temperature and considering that salt water is heated, this decontamination is highly corrosive and leads to the corresponding corrosion damage, thus necessitating the use of expensive materials, such as duplex steels, titanium or the like. The known solution is biologically very compatible for the environment. In particular, no toxic contaminants are formed. Only temperature control for the heating means to be triggered and monitored is very complex, and requires correspondingly trained operators.

It had already been suggested in the prior art that the microorganisms in the filter fabrics of a filter be destroyed by oxidation technologies using UV radiation. Ozone, chlorine dioxide and other toxic contaminants are then formed which contraindicate industrial use. The described devices in the prior art need not be limited to seawater applications, but can fundamentally always be used wherever problems occur with respect to bacterial and organic contaminants, as can occur for example in water filtering in industrial facilities, such as power plants.

SUMMARY OF THE INVENTION

Objects of the present invention are to provide an improved filter installation and a method for its operation which, while being able to ensure highly effective decontamination of biological materials, are reliable even over long periods of use without forming toxic by-products and without possible corrosion being promoted, and guarantee effective, economical cleaning.

These objects are basically achieved by a filter installation and a method where the agents for biological contamination have active ingredients such as inert gases and special metals which can be placed in the filter housing. Toxic impurities cannot occur, and the active substances used, in contrast to chemically produced fungicides and herbicides, are environmentally compatible by their being found directly in nature in this way without harmful intermediate decomposition products. The indicated active substances according to the present invention are also chosen such that corrosion damage can be avoided. Especially when using special metals, effective corrosion protection can build up, even if the metals themselves specifically kill the indicated living organisms, including plant material.

In one preferred embodiment of the filter installation according to the present invention, the inert gas is nitrogen gas which can be taken from at least one storage bottle. Preferably, after completion of the actual filtration, the nitrogen can be flushed into the interior of the filter housing with the filter element. The inert gas nitrogen within the filter housing creates a dry, oxygen-free environment used to kill living organisms. This nitrogen gas can be very easily managed using devices. It is easily economically available worldwide as a refill gas, and effectively controls the danger of corrosion. Instead of nitrogen gas, the filter could optionally be flushed in a less desirable version with compressed air. Since compressed air is generally available aboard ship, its use however does not lead to an oxygen-free environment and thus it can be used only as an emergency measure. Preferably, the inert gas in the associatable storage bottle is provided with high pressure such that the filter housing can also be flushed empty if the filter housing is still filled with seawater of a definable pressure (ambient pressure).

In another preferred embodiment of the filter installation according to the present invention, in the filter housing copper is used as the special metal in the form of at least one sacrificial anode. Since copper occurs in the environment and is not environmentally harmful at a correspondingly high dilution by seawater, it is especially well suited for the indicated use, especially with respect to killing of the indicated living microorganisms. Due to the configuration as a sacrificial anode, the copper removal in this respect also counteracts the continually prevailing corrosion. In an especially space-saving manner, the sacrificial anode can be accommodated in the filter housing if it is part of the filter elements used. By integrating the copper sacrificial anode into the filter elements, the fluid flow behavior within the filter housing is not hindered. This arrangement benefits overall operation of the system in terms of energy.

In one especially preferred embodiment of the filter installation according to the present invention, the design ensures ordinary filtering operation and, at the same time, allows backflushing for some of the filter elements to be able to use the cleaned filter elements for new filtration operations. Preferably, the fluid outlet of the filter is provided with a triggerable check valve. In the fluid flow direction following in the fluid line, a non-return valve is used such that in the opened position the exterior is connected to the associatable fluid line. As a result of the fluid lines which are very long in ships and power plants, water hammers can be avoided with the check valve blocked by the ambient air being able to flow after into the fluid lines via the non-return valve. Air volumes which may form in this way in the fluid line can be used then in the opposite direction as a damping element if water hammers in operation of the system can be expected in the opposite direction.

In the method according to the present invention for operation of this filter installation, coarse contaminants are filtered out of biologically contaminated fluid supplied via a fluid line by the filter element in the filter housing of a filter with agents for biological decontamination of the fluid releasing active substances such as inert gases and/or metal. The filter installation according to the present invention can be operated as a seawater filter installation. It can also be used for water filtration in industrial facilities, such as power plants. Furthermore, applications are possible particularly when problems arise within fluids with bacterial and/or organic impurities.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
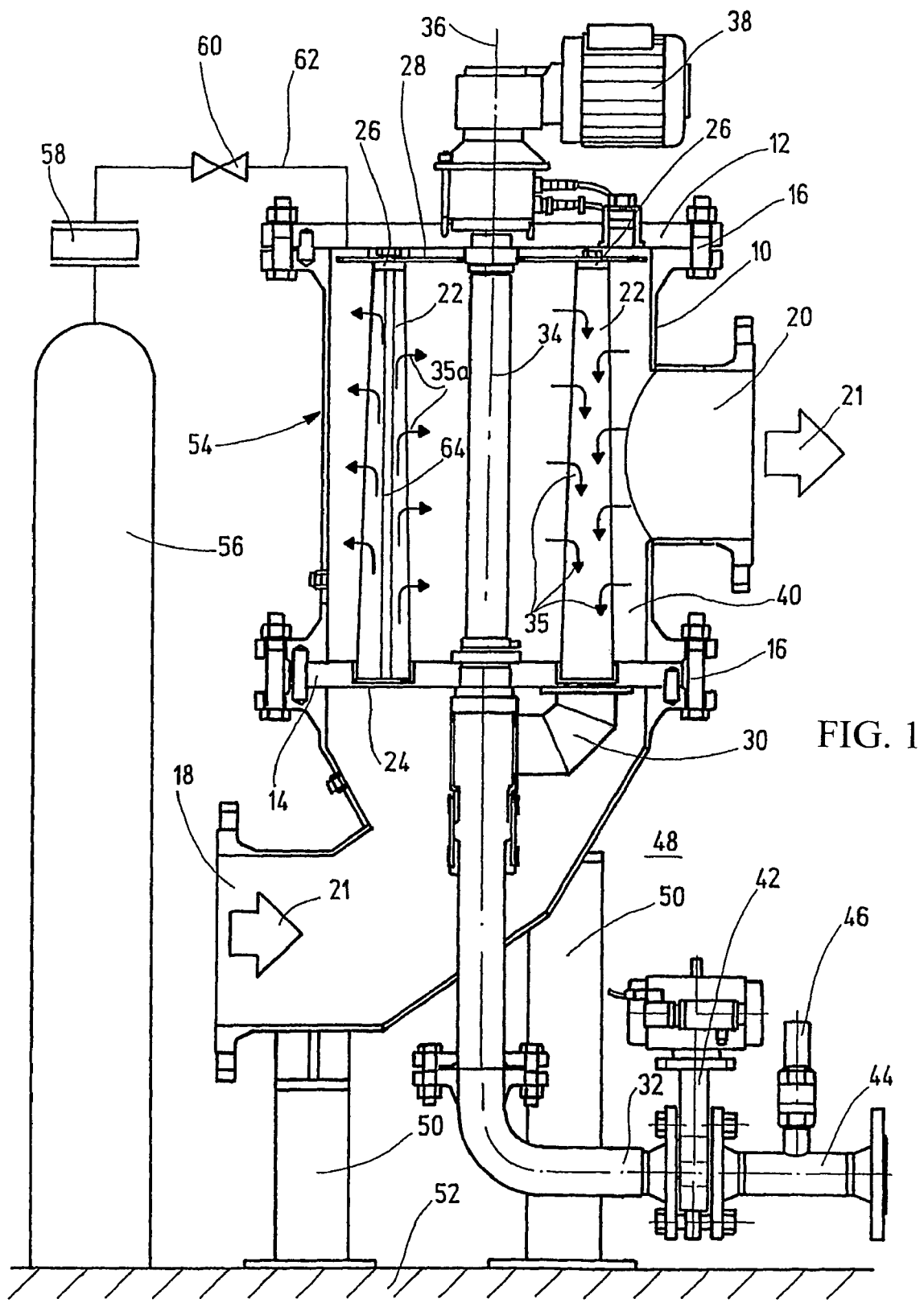
FIG. 1 is a schematic, not to scale, side elevational view partially in section, of one embodiment of a filter installation according to the present invention.

The filter installation shown in FIG. 1 is designed as a backflushing device and has a cylindrical filter housing 10 with two sealing covers 12, 14 attached to the filter housing 10 by flange connections 16. The filter housing 10 of the backflushing filter device has one filter inlet 18 for the fluid to be filtered and one filter outlet 20 for the filtered fluid. Both the filter inlet 18 and the filter outlet 20 are parts of a fluid line which can run or extend over very long distances, for example in the cargo space of a container ship (not shown). The fluid direction in filter operation is symbolized in the FIGURE with the corresponding arrows 21 at the filter inlet 18 and at the filter outlet 20.

Filter elements 22 tapering towards the top are inserted into the filter device. At least partially cylindrical filter elements (not shown) can replace the conical filter elements 22. The conical filter elements 22 are preferably made as tubular, wedge wire screen filter elements, and are configured at distances from one another along a cylindrical (concentric) arc within the filter housing 10. For an embodiment (not shown), the filter elements 22 can be configured divided repeatedly into groups along cylindrical arcs. Conical filter elements have the advantage that they allow uniform through-flow, with the result of low pressure loss, and enable complete cleaning of the elements in the backflushing cycle.

The filter elements 22 shown in the FIGURE open with their inlet cross section 24, that is, with their free openings, into recesses of the lower sealing cover 14 made correspondingly cylindrical. On their opposite ends, the filter elements 22 are provided with sealing caps 26 via which the filter elements 22 are held on a plate-shaped intermediate piece 28 abutted by the upper sealing cover 12 from its top.

For actual backflushing with the backflushing filter device, a drivable flushing arm 30, on its underside, provides a connection in the form of a fluid outlet 32 for fouled fluid. The flushing arm 30 can be moved via a drive rod 34 in succession to under the inlet cross sections 24 of the filter elements 22. Backflushing therefore takes place continuously with the actual filtration process. One filter element 22 is backflushed, from the outside to the inside, with the cleaned, filtered fluid which forms in filtration with the other filter elements 22. The flushing arm 30 extends in succession under the free inlet cross sections 24 of each filter element. The backflushing direction is indicated in the FIGURE with arrows 35 from the outside to the inside. The conventional filtration direction analogously is shown with arrows 35a, from the inside to the outside. If the filter elements 22 grouped along cylindrical or concentric arcs are configured repeatedly within the filter housing 10, the flushing arm 30 requires another arm section of different length (not shown), which can then extend under the other group of filter elements 22 on the side of their respective inlet cross section 24.

The discharge of the fluid fouled in this way and forming during backflushing proceeds via the tubular fluid outlet 32. The drive rod 34 extends through the filter housing 10 along the longitudinal axis 36 of the backflushing device and through both the upper sealing cover 12 and the lower sealing cover 14. For driving of the drive rod 34, especially in the form of a hollow shaft, on the upper sealing cover 12, a spline shaft connection (not shown) drives the drive rod 34 with an electric motor 38 to rotate around the longitudinal axis 36. The filter inlet 18 is formed in terms of its outside wall in the form of a diffuser which reduces the fluid inlet speed of the fouled fluid to be filtered with a simultaneous pressure increase on the inlet cross sections 24 of the conical elements 22 left open by the flushing arm 30. The diffuser action is promoted especially by the inlet cross sections at the filter inlet 18 and the cross section of the receiving space 40 being made essentially the same. The transition between the filter inlet 18 and the receiving space 40 takes place essentially uniformly, without a reduction in cross section.

The conical structure of the filter elements 22 creates a passage surface in each filter element that is very large. The distance between adjacent conical elements 22 increases in the direction of the filter outlet 20 from the inlet so that a smaller resistance is offered to the filtered fluid upon emergence from the interior of the respective filter element 22, compared to known solutions with exclusively cylindrical elements. Furthermore, the conical structure of the filter elements 32 yields a constant liquid flow when the elements are being backflushed. The fluid outlet 32 can be blocked by a controllable check valve 42. Following or downstream in the fluid flow direction in another fluid line 44, a spring-loaded non-return valve 46 acts with a closing ball which points toward the exterior 48, and is held spring-loaded in this way in the closed position. If the check valve 42 is closed and a water hammer situation occurs due to the other fluid line 44 which is made long, the spring-loaded non-return valve 46 can open and, in this way, can produce an air-guiding connection between the exterior 48 and the interior of the fluid line 44. In this way, the check valve 42 is relieved of replenishing processes within the other fluid line 44. In the reverse case, that is, for fluid pressure loading in the direction of the check valve 42, the non-return valve 46 effects a spring-loaded closure of the connection between the exterior 48 and the fluid line 44. The air volume enclosed for example in the fluid line 44 forms a damper element which likewise relieves the check valve 42 in the closed state and subsequent system parts of the filter against water hammers. Preferably, the filter installation can be mounted upright by base legs 50 above the floor of the hall or deck 52 of the ship.

The filter 54 in the FIGURE can be connected to a storage bottle 56 which can likewise be mounted upright above the floor or deck 52 and which preferably holds nitrogen gas as the inert gas under high pressure. Via a pressure reducer 58 and via a solenoid valve 60 which can be triggered from the outside, the interior of the storage bottle 56 can be connected via a connecting line 62 to the filter 54 by one free end of the connecting line 62 extending through the sealing cover 12 and thus establishing a connection or fluid communication to the interior of the filter housing 10. Furthermore, at least for some of the filter elements 22, a sacrificial anode 64 made as a copper rod runs and extends concentrically in their interior and in their longitudinal directions. This sacrificial anode 64 is preferably made as a solid rod, and is releasably connected via a screw connection (not shown) to the upper sealing cap 26 of the respective filter elements 22. By permanent release of copper, the sacrificial anode 64 is used up so that from time to time a new sacrificial anode 64 must be installed. This replacement can optionally take place with replacement of a used filter element 22 as a whole.

For the sake of better understanding, the filter installation will be described below using a seawater application. After opening the corresponding sea valves (not shown) on the ship's hull, seawater, generally fouled harbor water, flows via the filter inlet 18 into the filter 54, and the individual filter elements 22 in the directions of the arrows 35 to clean the fouled harbor water. The cleaned seawater can be supplied in the direction of the arrow 21 via the filter outlet 20 to ballast tanks in the ship's hull (not shown). At the same time, this cleaned seawater from the filter elements not connected to flushing arm 30 is used simultaneously to clean the fouled filter elements 22 connected to flushing arm 30 during filtration operation in the opposite direction of the arrows 35. This fouled backflushing liquid travels back to the exterior via the other fluid line 44 with the check valve 44 opened and the sea valves opened accordingly. In this conventional filtration operation, it cannot be precluded that the filter elements 22 become at least partially clogged with biological material such as microorganisms. They have ideal growth conditions, especially in voyages, in warm waters to spread further within the filter 54. If the filter 54 is restarted in other waters, that is, in a foreign harbor or on the open sea, this restarting would lead to the biologically entrained material being flushed out resulting in the indicated microorganisms entering into the foreign biotope.

To prevent this occurrence, according to the present invention, while still in the original harbor or at sites of conventional seawater filtration operation, the filter 54 as such is shut down. After opening the solenoid valve 60, nitrogen gas from the storage bottle 56 penetrates via the pressure reduction valve 58 into the interior of the filter housing 10. Residual seawater fluid in the filter housing 10 is displaced by the high nitrogen pressure out of the interior of the filter housing 10 so that the filter elements 22 held in the filter housing 10 are completely flushed by the nitrogen gas. Thus, within the filter housing 10 an extremely dry, oxygen-free environment is created. This environment kills microorganisms, also in the form of plant material, which may have entered. If the filter installation is restarted elsewhere, there is no danger of unintentional discharge of foreign organisms. In addition to or instead of inert gas supply, the sacrificial anode 64 can also be used as the active substance. It is composed preferably of a metal material which is toxic, especially fatal to microorganisms. It has been shown that especially with respect to the desired corrosion protection, sacrificial anodes 64 of copper can be advantageously used.

With the present invention, not only is a filter installation created, with which conventional filtration tasks for elimination of contamination, especially in seawater, can be performed, but with which it is also possible to kill biological material with a simultaneous increase of corrosion protection. The filter installation according to the present invention manages with few standard components, so that the cost for implementing the filter installation is reduced. Furthermore, reliable use takes place due to the standard components. The filter installation can be used wherever fluid media must be filtered and wherever microbial burdens which are not desirable can be expected.

While one embodiment has been chosen to illustrate the invention, it will be understood by those skilled in the art that various changes and modifications can be made therein without departing from the scope of the invention as defined in the appended claims.

What is claimed is:

1. A filter installation, comprising:
    a fluid line transporting biologically contaminated fluid;
    a filter in said fluid line having at least one filter element in a filter housing;
    an inert gas supply in fluid communication with said filter housing; and
    at least one sacrificial metal anode located in said filter element;
    whereby, said inert gas and said anode constitute active ingredients for biological decontamination of the filter.

2. A filter installation according to claim 1 wherein said biologically contaminated fluid is seawater.

3. A filter installation according to claim 1 wherein said inert gas supply comprises a storage bottle of nitrogen gas connected to said filter housing to flush an interior of said filter housing and said filter element with said nitrogen gas after completion of filtration.

4. A filter installation according to claim 3 wherein said nitrogen gas is stored at a sufficiently high pressure to flush said filter housing empty of fluid during decontamination.

5. A filter installation according to claim 1 wherein said metal anode contains copper.

6. A filter installation according to claim 1 wherein said filter comprises multiple filter elements arranged along a concentric path, interchangeably mounted in said filter housing and permitting flow therethrough in a filter direction and in an opposite backflushing direction;
    said filter housing has a filter inlet receiving the biologically contaminated fluid to be filtered and a filter outlet for filtered fluid; and
    a drivable flushing arm is movably connected to said filter housing for movement in succession to engage free inlet cross sections of said filter elements in fluid communication, and has a fluid outlet receiving fouled fluid from backwashing of a filter surface of at least one of said filter elements simultaneously with filtering in other filter elements.

7. A filter installation according to claim 6 wherein
said fluid outlet is connected to a backflush fluid line having a triggerable check valve and a non-return valve located downstream of said check valve, said non-return valve connecting said backflush fluid line to an exterior in an open position of said non-return valve.

8. A filter installation according to claim 6 wherein
at least some of said filter elements are conical.

9. A filter installation according to claim 1 wherein
said metal anode comprises a copper rod extending concentrically within said filter element.

10. A filter installation according to claim 9 wherein
said copper rod is releasably connected to said filter element.

11. A filtering method comprising the steps of:
transporting biologically contaminated fluid through a fluid line and into a filter in the fluid line;
filtering the contaminated fluid by conveying the contaminated fluid through a filter element in a filter housing of the filter; and
decontaminating the filter by supplying inert gas in the filter housing and by contacting the fluid with a sacrificial metal anode in the filter element, with the inert gas and metal anode being active ingredients for decontaminating the filter.

12. A filtering method according to claim 11 wherein
the contaminated fluid is seawater.

13. A filtering method according to claim 11 wherein
the inert gas is nitrogen gas, is stored in a storage bottle and is conveyed into an interior of the filter housing after completion of a filtering operation to flush the filter housing with the nitrogen gas.

14. A filtering method according to claim 13 wherein
the nitrogen gas is stored and conveyed at sufficiently high pressures to flush the filter housing empty of fluid during decontaminating.

15. A filtering method according to claim 11 wherein
the metal anode contains copper.

16. A filtering method according to claim 11 wherein
multiple filter elements arranged along a concentric path are interchangeably mounted in the filter housing, and have flow therethrough in a filter direction and in an opposite backflushing direction;
the biologically contaminated fluid to be filtered is received through a filter inlet of the filter housing and filtered fluid is conveyed through a filter outlet of the filter housing; and
a drivable flushing arm is movably connected to the filter housing and is moved in succession to engage free inlet cross sections of the filter elements in fluid communication; and
a fluid outlet receives fouled fluid from backwashing of a filter surface of at least one of the filter elements simultaneously with filtering in other filter elements.

17. A filtering method according to claim 16 wherein
said fluid outlet is connected to a backflush fluid line having a triggerable check valve and a non-return valve located downstream of the check valve, the non-return valve connecting the backflush fluid line to an exterior in an open position of the non-return valve.

18. A filtering method according to claim 16 wherein
at least some of the filter elements are conical.

19. A filtering method according to claim 11 wherein
the metal anode comprises a copper rod extending concentrically within the filter element.

20. A filtering method according to claim 19 wherein
the copper rod is releasably connected to said filter element for replacement.

* * * * *